April 2, 1957     I. D. PRESS     2,787,289
FLAME-RESISTANT FLEXIBLE HOSE ASSEMBLY
Filed Dec. 1, 1954
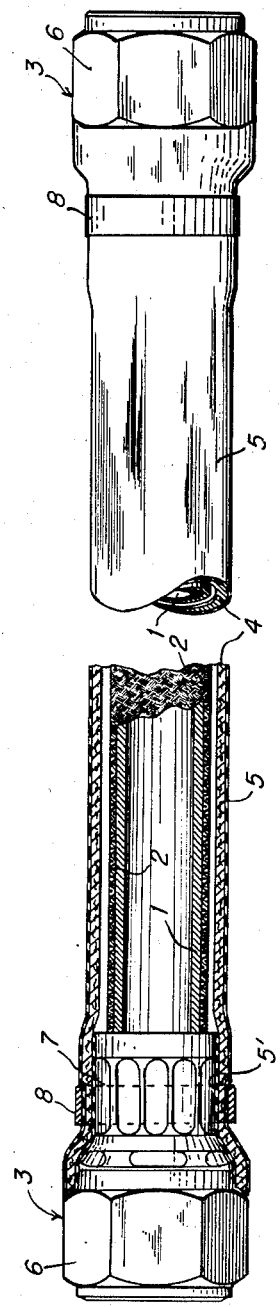
INVENTOR.
Irving D. Press
BY
Churchill, Rich, Weymouth & Engel
Attorneys

United States Patent Office 2,787,289
Patented Apr. 2, 1957

2,787,289

FLAME-RESISTANT FLEXIBLE HOSE ASSEMBLY

Irving D. Press, West Orange, N. J., assignor to Resistoflex Corporation, Belleville, N. J., a corporation of New York Application December 1, 1954, Serial No. 472,280

4 Claims. (Cl. 138—55)

This invention relates to flexible hose assemblies, more particularly hose lines for use on aircraft for conveying fuel, lubricant and hydraulic fluid.

One of the great hazards in airplane operation is fire. In the event of fire one of the most vulnerable parts of the plane's equipment is the conduit system, comprising a multitude of flexible connections in the form of hose assemblies, carrying highly volatile fuel and lubricating oil. The normal equipment of many aircraft includes fire detection and suppression apparatus but this may be of no avail unless time is allowed for its operation and the extinguishing of a fire before it has ruptured a flexible hose line carrying fuel or oil. Other flexible hose assemblies, while not carrying such very combustible material, are of equal importance in that they are parts of hydraulic systems for actuating essential controls the loss of which may render the plane unmanageable, prevent or endanger landing, or increase the size of the fire. For example, propeller feathering hydraulic lines are of the utmost importance in controlling a fire in an engine nacelle, the most frequent location. On detection of a fire the engine is shut off and the fuel valves closed but if the propeller cannot be feathered the engine will "windmill" and may throw or pump out into the fire so much fuel and oil as to put the fire beyond control. However, if such a critical flexible conduit can remain in functioning condition in a fire for only a few minutes it may suffice to enable the aircraft to be saved. If it will stand up in a flame for 15 minutes under an internal fluid temperature of 200° F. at a pressure of 35 p. s. i. and a given flow rate determined by the size of the hose, it qualifies for the C. A. A. rating of "fireproof." The flow rate specified for this test is five times the square of the nominal I. D. of the hose in inches, expressed in gallons per minute. The hose assembly of the invention hereinafter described has not only met this test but has met a like test wherein the internal pressure was increased to 1000 p. s. i.

The object of the present invention is to provide a flexible hose assembly having increased fire resistance so that its functional life under actual fire conditions is greatly prolonged. This has the obvious advantages of allowing time for extinguishing apparatus to operate or be operated, valves to be closed, hydraulic equipment to be moved, etc., thus decreasing the risk of total destruction by fire.

The hose assembly of the invention comprises, as shown in the single figure of the drawing, a tube 1 of Teflon (polytetrafluoroethylene) preferably formed by the so-called paste extrusion process, well known to those skilled in the art, followed by sintering. This plastic is capable of withstanding temperatures somewhat above 500° F. without deterioration. The term "Teflon" as used herein is to be taken as meaning a material which is principally polytetrafluoroethylene but which may include minor amounts of other copolymerizable monomers and other materials which may be used to improve the working characteristics or other properties of the material, for example carbon black as disclosed in the copending United States application of B. M. Walker and L. W. Van Denburgh, Jr., Ser. No. 440,858, filed July 1, 1954, now Patent No. 2,752,637, granted July 3, 1956. On this tube are one or more layers of reinforcing wire braid 2, preferably stainless steel, to increase its burst pressure. This hose is secured at its ends in fittings or coupling members generally designated 3, preferably of steel and of the construction described in my copending United States application Ser. No. 460,025, filed October 4, 1954. An important feature of such a fitting is that the wire braid is anchored in the fitting, preventing blow-off even if the synthetic resin tube is softened or disintegrated by excessive heat. Over the entire hose is a flexible tubular cover 4 of woven or braided asbestos which is coated or impregnated with some substantially oil-poof material such as one of the synthetic rubbers, for example Buna, or silicone rubber as shown at 5. This coating is applied also around the ends and on the inside of the tubing 4 as shown at 5′ so as to underlie the clamping means hereinafter described. The I. D. of the tubing 4, it should particularly be noted, is greater than the O. D. of the outer wire braid cover 2 so that a substantial volume of air is enclosed between the hose and the asbestos cover. It will also be seen that tubing 4 is of such length as to cover the fittings 3 over the portions thereof within which the hose is secured, leaving only the swivel hex-nut portions 6 exposed. The tubing 4 is tightly clamped on the fitting ferrules 7 by steel bands 8 contracted or crimped thereon after assembly.

The method of assembly is to apply one end fitting 3 to the hose, slip on the asbestos cover and push it back far enough to permit the other end fitting to be applied, then draw it over both fittings and crimp the bands 8 in place.

The asbestos cover acts as a flame shield for the enclosed hose and fittings and it, together with the entrapped air, provides a heat insulating blanket, the air being particularly effective for this purpose. The oil-proof coating on the cover and its tight seals at the ends by bands 8 prevents any absorption of combustible fluid by the cover or any leaking thereof into the air space from the outside even if the assembly should accidentally be submerged.

The foregoing detailed description is merely illustrative of an embodiment of the invention which is defined in the appended claims.

What is claimed is:

1. A flexible hose assembly capable of functioning for a considerable period during which it is subjected to an open flame comprising a hose consisting of a tube of Teflon and at least one tubular layer of reinforcing wire braid on said tube, fittings attached to opposite ends of said hose and anchored to said wire braid independently of said tube, a flexible asbestos tubular cover surrounding said hose and those portions of the fittings which surround the hose ends, said cover having an internal diameter greater than the outside diameter of said hose whereby a substantial volume of air is enclosed between them, means securing said cover to said fittings, said cover being coated on its outer surface and on its ends and inner surface for a distance sufficient to underlie said securing means with a flexible material resistant to fluid fuels and oils.

2. A flexible hose assembly capable of functioning for a considerable period during which it is subjected to an open flame comprising a tube of Teflon, a tubular layer of reinforcing wire braid on said tube, fittings attached to opposite ends of the hose comprising said tube and braid, a flexible asbestos tubular cover surrounding said hose and portions of said fittings, said cover having an internal diameter greater than the outside diameter of said hose whereby a substantial volume of air is enclosed between them, metal bands contracted on said cover and securing it to said fittings, said cover being coated on its outer surface and on its ends and inner surface for a distance sufficient to underlie said bands with a fuel and oil resistant flexible material.

3. A flexible hose assembly capable of functioning for a considerable period during which it is subjected to an open flame comprising a tube of Teflon, fittings attached to opposite ends of said tube, a flexible asbestos tubular cover surrounding said tube and those portions of the fittings which surround the tube ends, said cover having an internal diameter greater than the outside diameter of said tube whereby a substantial volume of air is enclosed between them, means securing said cover to said fittings, said cover being coated on its outer surface and on its ends and inner surface for a distance at least sufficient to underlie said means with a fuel and oil resistant flexible material.

4. A flame resistant flexible hose assembly comprising a tube of Teflon having a tubular layer of reinforcing wire braid on said tube, fittings attached to opposite ends of the hose composed of said tube and braid and mechanically anchored to said braid independently of said tube, a flexible asbestos tubular cover surrounding said hose and those portions of the fittings which surround the hose ends, said cover being larger than said hose whereby a substantial volume of air is enclosed between them, metal bands contracted on said cover and securing it to said fittings, said cover being coated on its exposed surfaces with an oil-impervious flexible material.

References Cited in the file of this patent

UNITED STATES PATENTS

| | | |
|---|---|---|
| 945,686 | Bonner | Jan. 4, 1910 |
| 2,400,099 | Brubaker et al. | May 14, 1946 |
| 2,463,293 | Mentel | Mar. 1, 1949 |
| 2,634,759 | Twickler | Apr. 14, 1953 |
| 2,679,867 | Epstein | June 1, 1954 |